US008688148B2

(12) United States Patent
Steenstra et al.

(10) Patent No.: US 8,688,148 B2
(45) Date of Patent: Apr. 1, 2014

(54) DYNAMIC RESOURCE MATCHING SYSTEM

(75) Inventors: Jack Steenstra, San Diego, CA (US);
Alexander Gantman, Poway, CA (US);
Kirk S. Taylor, San Diego, CA (US);
Liren Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 411 days.

(21) Appl. No.: 11/258,728

(22) Filed: Oct. 25, 2005

(65) Prior Publication Data

US 2007/0093258 A1    Apr. 26, 2007

(51) Int. Cl.
*H04W 24/00*    (2009.01)

(52) U.S. Cl.
USPC .............. 455/456.5; 455/404.2; 455/414.1; 455/418; 455/456.1; 455/456.2; 455/456.3; 455/456.6; 455/457; 370/310.2; 370/328; 370/338

(58) Field of Classification Search
USPC ........ 455/404.2, 414.1, 418–420, 456.1–457; 370/310.2, 328, 338
See application file for complete search history.

(56) References Cited

U.S. PATENT DOCUMENTS

| | | | | |
|---|---|---|---|---|
| 5,852,775 | A * | 12/1998 | Hidary ........................ | 455/412.1 |
| 5,978,747 | A * | 11/1999 | Craport et al. ................ | 702/150 |
| 6,243,039 | B1 * | 6/2001 | Elliot ........................... | 342/457 |
| 6,246,376 | B1 * | 6/2001 | Bork et al. .................... | 343/760 |
| 6,249,282 | B1 * | 6/2001 | Sutcliffe et al. ............... | 715/751 |
| 6,381,603 | B1 * | 4/2002 | Chan et al. ....................... | 707/10 |
| 6,542,749 | B2 * | 4/2003 | Tanaka et al. ............... | 455/456.1 |
| 6,549,768 | B1 * | 4/2003 | Fraccaroli .................. | 455/456.3 |
| 6,564,047 | B1 * | 5/2003 | Steele et al. .................. | 455/405 |
| 6,628,938 | B1 * | 9/2003 | Rachabathuni et al. ... | 455/456.3 |
| 6,735,568 | B1 | 5/2004 | Buckwalter et al. | |
| 6,756,913 | B1 * | 6/2004 | Ayed ........................ | 340/825.49 |
| 6,819,919 | B1 * | 11/2004 | Tanaka ........................ | 455/414.1 |
| 6,828,908 | B2 * | 12/2004 | Clark ........................ | 340/539.13 |

(Continued)

FOREIGN PATENT DOCUMENTS

| | | |
|---|---|---|
| GB | 2375921 A | 11/2002 |
| JP | 9325938 A | 12/1997 |

(Continued)

OTHER PUBLICATIONS

Advisory Action mailed Dec. 24, 2008, for U.S. Appl. No. 10/924,480, filed Aug. 24, 2004.

(Continued)

*Primary Examiner* — Steve D Agosta
(74) *Attorney, Agent, or Firm* — Fariba Yadegar-Bandari (57) ABSTRACT

A method, apparatus, and system are provided for implementing resource and/or location-based matching services between a wireless terminal (e.g., mobile phone) user and one or more resources. A novel infrastructure supports resource and/or location based matching services over a wireless network. A back-end system includes a database, server, and match engine that are configured match a user with one or more resources based on the user's characteristics, preferences, and/or location. Such resources include (1) other users, (2) targeted advertising, (3) businesses/networking opportunities, and/or (4) locate a nearby service or store. A flexible database architecture supports application-specific resources which facilitate the deployment of various matching services. Application developers are thus able to implement different resource-matching applications for wireless devices through a common back-end infrastructure. Additionally, the match engine may include a feedback mechanism that permits the match engine to learn a user's preferences.

25 Claims, 6 Drawing Sheets

(56) References Cited

U.S. PATENT DOCUMENTS

| | | | |
|---|---|---|---|
| 7,057,591 B1* | 6/2006 | Hautanen et al. | 345/87 |
| 7,155,238 B2* | 12/2006 | Katz | 455/456.1 |
| 7,343,317 B2 | 3/2008 | Jokinenn et al. | |
| 7,359,706 B2* | 4/2008 | Zhao | 455/436 |
| 7,359,716 B2 | 4/2008 | Rowitch et al. | |
| 7,505,757 B2 | 3/2009 | Rowitch et al. | |
| 2001/0025248 A1 | 9/2001 | Nihei | |
| 2002/0034292 A1* | 3/2002 | Tuoriniemi et al. | 379/219 |
| 2002/0055992 A1 | 5/2002 | King et al. | |
| 2002/0086676 A1 | 7/2002 | Hendrey et al. | |
| 2002/0103792 A1* | 8/2002 | Blank et al. | 707/3 |
| 2002/0173978 A1* | 11/2002 | Boies et al. | 705/1 |
| 2002/0184653 A1* | 12/2002 | Pierce et al. | 725/143 |
| 2003/0018711 A1 | 1/2003 | Imanishi | |
| 2003/0033582 A1 | 2/2003 | Klein et al. | |
| 2003/0114171 A1 | 6/2003 | Miyamoto et al. | |
| 2003/0154126 A1 | 8/2003 | Gehlot et al. | |
| 2003/0200192 A1 | 10/2003 | Bell et al. | |
| 2003/0216960 A1 | 11/2003 | Postrel | |
| 2004/0100377 A1 | 5/2004 | Brackett et al. | |
| 2004/0198398 A1 | 10/2004 | Amir et al. | |
| 2004/0203923 A1 | 10/2004 | Mullen | |
| 2005/0048987 A1 | 3/2005 | Glass et al. | |
| 2005/0131716 A1* | 6/2005 | Hanan et al. | 705/1 |
| 2005/0181803 A1* | 8/2005 | Weaver et al. | 455/456.1 |
| 2006/0047825 A1 | 3/2006 | Steenstra et al. | |
| 2006/0064346 A1 | 3/2006 | Steenstra et al. | |
| 2006/0270419 A1 | 11/2006 | Crowley et al. | |
| 2009/0176506 A1 | 7/2009 | Rowitch et al. | |

FOREIGN PATENT DOCUMENTS

| | | |
|---|---|---|
| JP | 11316541 A | 11/1999 |
| JP | 2000167233 | 6/2000 |
| JP | 2000295170 A | 10/2000 |
| JP | 2001167384 A | 6/2001 |
| JP | 2001222490 A | 8/2001 |
| JP | 2001265809 | 9/2001 |
| JP | 2001266001 A | 9/2001 |
| JP | 2001291004 A | 10/2001 |
| JP | 2001292238 A | 10/2001 |
| JP | 2001309440 | 11/2001 |
| JP | 2001338083 A | 12/2001 |
| JP | 2001351005 A | 12/2001 |
| JP | 2002027529 A | 1/2002 |
| JP | 2002222138 A | 8/2002 |
| JP | 2002259800 | 9/2002 |
| JP | 2002277279 | 9/2002 |
| JP | 2002288207 A | 10/2002 |
| JP | 2002315059 | 10/2002 |
| JP | 2002366971 A | 12/2002 |
| JP | 2003030230 A | 1/2003 |
| JP | 2003044741 A | 2/2003 |
| JP | 2003087420 A | 3/2003 |
| JP | 2003186900 A | 7/2003 |
| JP | 2003209876 A | 7/2003 |
| JP | 2003324547 A | 11/2003 |
| JP | 2004056159 A | 2/2004 |
| JP | 2004062490 A | 2/2004 |
| JP | 2004192627 A | 7/2004 |
| KR | 1020010008054 | 2/2001 |
| KR | 20020069767 A | 9/2002 |
| WO | WO9741654 A1 | 11/1997 |
| WO | WO0022860 A1 | 4/2000 |
| WO | WO0028427 | 5/2000 |
| WO | WO02062092 A1 | 8/2002 |

OTHER PUBLICATIONS

Advisory Action mailed Jan. 29, 2010, for U.S. Appl. No. 10/924,480, filed Aug. 24, 2004.
Advisory Action mailed Nov. 30, 2007, for U.S. Appl. No. 10/924,480, filed Aug. 24, 2004.
Final Office Action mailed Apr. 16, 2010, for U.S. Appl. No. 10/931,309, filed Aug. 31, 2004.
Final Office Action mailed Aug. 27, 2008, for U.S. Appl. No. 10/931,309, filed Aug. 31, 2004.
Final Office Action mailed Nov. 17, 2009, for U.S. Appl. No. 10/924,480, filed Aug. 24, 2004.
Final Office Action mailed Oct. 3, 2007, for U.S. Appl. No. 10/924,480, filed Aug. 24, 2004.
Final Office Action mailed Oct. 17, 2008, for U.S. Appl. No. 10/924,480, filed Aug. 24, 2004.
International Search Report and Written Opinion—PCT/US06/060244, International Search Authority—European Patent Office, Mar. 28, 2007.
Non-Final Office Action mailed Apr. 3, 2009, for U.S. Appl. No. 10/924,480, filed Aug. 24, 2004.
Non-Final Office Action mailed Apr. 10, 2007, for U.S. Appl. No. 10/924,480, filed Aug. 24, 2004.
Non-Final Office Action mailed Apr. 14, 2008, for U.S. Appl. No. 10/924,480, filed Aug. 24, 2004.
Non-Final Office Action mailed Feb. 27, 2009, for U.S. Appl. No. 10/931,309, filed Aug. 31, 2004.
Non-Final Office Action mailed Mar. 28, 2008, for U.S. Appl. No. 10/931,309, filed Aug. 31, 2004.
Non-Final Office Action mailed Oct. 19, 2009, for U.S. Appl. No. 10/931,309, filed Aug. 31, 2004.
Response to Non-Final Office Action mailed Aug. 3, 2009, for U.S. Appl. No. 10/924,480, filed Aug. 24, 2004.
Response to Non-Final Office Action mailed Jul. 14, 2008, for U.S. Appl. No. 10/924,480, filed Aug. 24, 2004.
Response to Non-Final Office Action mailed Jul. 10, 2007, for U.S. Appl. No. 10/924,480, filed Aug. 24, 2004.
Response to Final Office Action mailed Jan. 15, 2010, for U.S. Appl. No. 10/924,480, filed Aug. 24, 2004.
Response to Final Office Action mailed Nov. 19, 2007, for U.S. Appl. No. 10/924,480, filed Aug. 24, 2004.
Response to Non-Final Office Action mailed Jan. 15, 2010, for U.S. Appl. No. 10/931,309, filed Aug. 31, 2004.
Response to Non-Final Office Action mailed May 26, 2009, for U.S. Appl. No. 10/931,309, filed Aug. 31, 2004.
Response to Non-Final Office Action mailed May 12, 2008, for U.S. Appl. No. 10/931,309, filed Aug. 31, 2004.
Response to Final Office Action mailed Nov. 24, 2008, for U.S. Appl. No. 10/931,309, filed Aug. 31, 2004.
Response to Final Office Action mailed Dec. 8, 2008, for U.S. Appl. No. 10/924,480, filed Aug. 24, 2004.
Appeal Brief mailed Apr. 12, 2010, for U.S. Appl. No. 10/924,480, filed Aug. 24, 2004.
Adelman, et al., "Social Support in the Service Sector: The Antecedents, Processes, and Outcomes of Social Support in an Introductory Service," Journal of Business Research, 1995, vol. 32, pp. 273-282, No Earlier than January of the Pub Year shown.
Ahuvia, et al., "Market Metaphors for Meeting Mates," Research in Consumer Behavior, 1993, vol. 6, pp. 55-83, No Earlier than January of the Pub Year shown.
Business Wire, "Social Networking Graduates to Wireless at SmallPlanet.Net," May 27, 2004, Retrieved May 8, 2013 from URL http://www.businesswire.com/news/home/20040527005224/en/Social-Networking-Graduates-Wireless- SmallPlanet.Net.
Cosmic Cupid—flirt by SMS, "A Picture is worth a thousand words," 2004, Archive URL http://www.cosmiccupid.com/matchpics.html, No Earlier than January of the Pub Year shown.
Kyodo News, Japan Today, "Counselors to monitor dating websites to protect minors," May 20, 2004, Retrieved May 8, 2013 from URL: http://www.thefreelibrary.com/Counselors+to+monitor+dating+websites+to+protect+minors.-a0117051944.
Mobule.net—Get Connected with Serendipity, "Serendipity," 2004, Archive URL: http://www.mobule.net/inquiries.php, No Earlier than January of the Pub Year shown.
New Media Age, "Making the perfect match: changes in both society and technology have made online dating an attractive business proposition. But how can companies cash in on the search for love?" Mar. 25, 2004, Retrieved on May 8, 2013 from URL http://www.highbeam.com/doc/1G1-114817785.html.

(56) References Cited

OTHER PUBLICATIONS

Newsweek International, "The Singles Scene: Bleep! She's Your Type!" Jun. 6, 2004, Retrieved May 8, 2013 from URL http://www.thedailybeast.com/newsweek/2004/06/06/the-singles-scene-bleep-she-s-your-type.html.

PR Newswire, "Lovehound, the First True Mobile Dating Service, Launches in Time for Valentine's Day," Feb. 13, 2004, 2 pages, Retrieved on May 8, 2103 from URL http://www.prnewswire.com/news-releases-test/lovehound-the-first-true-mobile-dating-service-launches-in-time-for-valentines-day-58993107.html, 2 pages.

Qualcomm, Press Release, "Qualcomm Congratulates China Unicom on its Announcement of Expanded High-Speed Value-Added Services," Jul. 22, 2003, Archive URL http://www.cdmatech.com/news/releases/2003/030722_unicom.jsp.

Reuters, "Wanted: new friend, must have Bluetooth," Jun. 23, 2004, Retrieved May 8, 2013 from URL http://usatoday30.usatoday.com/tech/wireless/data/2004-06-23-bluetooth-pals_x.htm.

Saw-You.com, Corporate Site, "Communidating," Oct. 2002, Archive URL http://www.saw-you.com/corporate/communidating.htm.

South China Morning Post, "Social networks could prove powerful connecting tool," Posted May 10, 2004, Retrieved May 8, 2013 from URL http://www.scmp.com/article/455155/social-networks-could-prove-powerful-connecting-tool.

text.it Media Centre, "SMS dating a real revenue spinner in India," May 13, 2003 (source silicon.con), Archive URL http://www.text.it/mediacentre/defaultasp?intPageId=494.

The New Atlantis, Christine Rosen, "Our Cell Phones, Ourselves," Testimonial regarding Dodgeball.com, Jun. 2004, Retrieved May 8, 2013 from URL http://www.thenewatlantis.com/publications/our-cell-phones-ourselves, 15 pages, See p. 5, paragraph 2.

WaveMarket, Press Release, "WaveMarket and Seoul Metropoligtan Police Agency Introduce Traffic and Road Speed Determination using Wireless Carrier Network and Location-Based Alerting Technology," Apr. 19, 2004, 1 page, Archive URL http://www.wavemarket.com/press_release6.html.

WaveMarket, "WaveMarket Introduces First Location-Based Blogging System That Lets Users Create, Broadcast and Share Location-Time Relevant Information," Feb. 16, 2004, 2 pages, Archive URL http://www.wavemarket.com/press_release1.htnnl.

webmapper, Oct. 2004 archives, Entry Monday, Oct. 18, 2004, "Location and social networks," Retrieved May 8, 2013 from URL http://www.webmapper.nl/archives/2004/10/.

Marketdata Enterprises, Inc., "The U.S. Dating Services Market," Apr. 2004, 167 pages.

\* cited by examiner

DYNAMIC RESOURCE MATCHING SYSTEM

BACKGROUND

1. Field

The present invention generally relates to communication systems, and more specifically to a system, apparatus and method for providing resource matching services to wireless terminals.

2. Background

Often, it is desirable to know the location of a wireless user. In fact, it is sometimes necessary. For example, the Federal Communications Commission (FCC) has adopted a report and order for an enhanced 911 (E-9-1-1) wireless service that requires the location of a wireless terminal (e.g., cellular phones) to be provided to a Public Safety Answering Point (PSAP) each time a 911 call is made from the wireless terminal. In addition to the FCC mandate, a network operator/service provider may support various applications that use location based services. Such services provide the location of wireless terminals. "Applications" refer to the particular uses that are made of location and/or resource information. Often times, applications are implemented with computer software that is either executed by a processor within a wireless terminal or by a processor located within a wireless infrastructure network that is in communication with the wireless terminal. Applications that use this location and resource information may include, for example, location-sensitive billing, asset tracking, asset monitoring and recovery, fleet and resource management, personal-location services, and so on. Some specific examples of applications for personal-location services include (1) providing a local map to a wireless terminal based on its location, (2) providing a recommendation for a facility (e.g., a hotel or a restaurant) based on the wireless terminal's location, and (3) providing directions to the recommended facility from the wireless terminal's location.

A flexible system for providing resource matching for wireless terminals has many applications, such as delivery of location-based content to wireless terminal users. For instance, advertising may be targeted to users meeting certain characteristics (e.g., interests, economic profile, age, food/music/entertainment preferences, etc.) and/or location. Accordingly, there is a need for a system and method for performing resource matching for wireless terminal users to display targeted content based on the characteristics and/or location of a wireless terminal user.

SUMMARY

One implementation of the invention provides a resource matching apparatus comprising: (a) a communication interface to communicate with one or more wireless device users; (b) a storage device configured to implement one or more databases for storing wireless device user preferences and application-specific user criteria; and (c) a processing unit coupled to the input interface and the storage device, the processing unit to implement a matching engine configured to (1) obtain user preferences and application-specific user criteria for a wireless device user from the storage device, (2) match the wireless device user with one or more resources based on the user preferences and application-specific user criteria, and (3) send the matches to the wireless device user via the communication interface. The processing unit may be further configured to (a) receive an indication that the wireless device user is ready to receive a match; (b) receive an indication of the type of matching service the wireless device user desires; (c) receive one or more match criteria from the wireless device user; (d) notify the match engine of the one or more match criteria; (e) receive a match selection from the wireless device user in response to the one or more matches; (f) compare the match selection to the one or more matches sent to the wireless device user; (g) adjust weights of the user preferences in the matching engine based on the wireless device user selection; (h) obtain current location information for the one or more wireless device users; and (i) match the one or more resources to the wireless device user based on the current location of the wireless device user. The one or more resource matches may be businesses in the vicinity of the wireless device user's current location. Additionally, the processing unit may be further configured to (a) provide the wireless device user with a map or directions to the one or more resource matches; and (b) provide the wireless device user with current location information of a second wireless device user. The storage device may be configurable to store a plurality of databases to support one or more match-enabled applications and implement one or more databases for storing advertisements and the processing unit is further configured to match the wireless device user with one or more advertisements and send the matched advertisements to the wireless device user.

Other embodiments of the invention provide a resource matching for wireless terminal users, the method comprising: (a) determining one or more matches for a wireless device user based on application-specific user criteria; (b) sending one or more resource matches to the user based on the application-specific user criteria; (c) receiving one or more match criteria from a wireless device associated with the wireless device user; (d) receiving an indication as to the type of matching service the wireless device user desires; (e) receiving a match selection from the user in response to the one or more resource matches; and (f) adjusting the user preferences based on the user selection. Several features of the method include (a) matching the wireless device user with one or more advertisements; (b) sending the advertisements to the user; (c) obtaining current location information for the wireless device user; and (d) matching the one or more resources to the wireless device user based on the current location of the wireless device user.

Another embodiment provides a processing unit comprising: (a) an input interface to receive preferences and location information for a wireless device user; (b) a circuit communicatively coupled to the input interface and configured to determine one or more matches for the user based on the user preferences and location; and (c) an output interface communicatively coupled to the circuit to provide one or more matches to the user based on the user preferences and current location. The processing circuit may be further configured to (a) receive information about the type of matching service the wireless device user desires; (b) receive one or more match criteria from the wireless device user; (c) receive a match selection from the wireless device user in response to the one or more matches; and (d) adjust the user preferences based on the user selection. The processing circuit may also be configured to (a) match the user with one or more advertisements; and (b) transmit the one or more advertisements to the user.

A machine-readable medium having one or more instructions for resource matching, which when executed by a processor causes the processor to: (a) obtain one or more resource matching criteria for a wireless communication device user; (b) provide one or more resource matches to the user based on the user match preferences and current location; (c) receive an indication that the wireless communication device user is ready to receive a match; (d) receive an indication as to the type of matching service the user desires;

(e) receive one or more match criteria from the wireless communication device user; (f) notify a matching engine of the one or more match criteria; (g) provide the wireless communication device user with a map or directions to the one or more resource matches; and (h) provide the wireless communication device user with current location information of a second wireless communication device user. The machine-readable medium may also have one or more instructions for resource matching which when executed by a processor causes the processor to (a) receive a match selection from the wireless communication device user in response to the one or more resource matches; (b) compare the match selection to the one or more matches sent to the wireless communication device user; and adjust the user preferences based on the wireless communication device user selection. In some embodiments, the one or more resource matches are one or more other registered users. In other embodiments, the one or more resource matches are targeted advertising. In yet other embodiments, the one or more resource matches are businesses in the vicinity of the user's current location.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, and optical storage devices capable of storing or containing data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by information, data, arguments, parameters, or memory contents. Information, arguments, parameters, data, etc. may be passed, forwarded, or transmitted via any suitable means including memory sharing, message passing, token passing, etc.

A method, apparatus, and system are provided for implementing resource and/or location-based matching services between a wireless terminal (e.g., mobile phone) user and one or more resources. A novel infrastructure supports resource and/or location based matching services offer a wireless network. A back-end system includes a database, server, and match engine that are configured to match a user with one or more resources based on the user's characteristics, preferences, and/or location. Such resources include (1) other users, (2) targeted advertising, (3) businesses/networking opportunities and/or (4) locating a nearby service or store. A flexible database architecture supports application-specific resources which facilitate the deployment of various matching services. Application developers are thus able to implement different resource-matching applications for wireless devices through a common back-end infrastructure. Additionally, the match engine may include a feedback mechanism that permits the match engine to learn a user's preferences.

Figure 1:
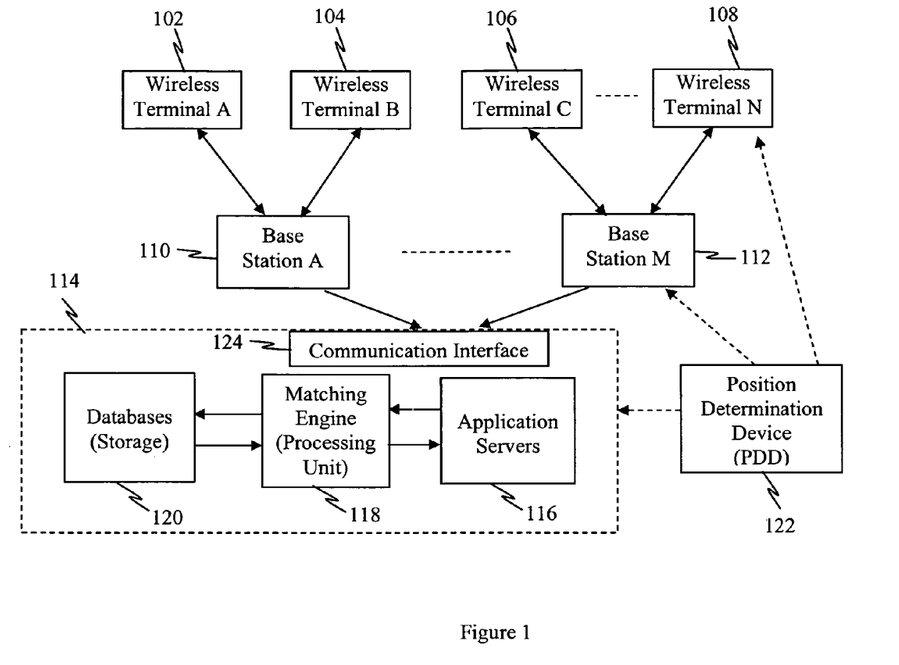
FIG. 1 is a block diagram illustrating a communication system in which one or more resource or location based matching services (LBS) may be implemented.

FIG. 1 is a block diagram illustrating a communication system in which one or more location-based services (LBS) may be implemented. The system includes one or more wireless terminals 102, 104, 106, and 108, communicatively coupled to one or more base stations 110 and 112. The base stations 110 and 112 serve as a bridge to a back-end operations system 114 where position-based matching services are provided for the wireless terminals 102, 104, 106, and 108. The back-end operations system 114 may include a communication interface 124, one or more applications servers 116, a matching engine 118 and one or more supporting databases 120. The various components or functions of the back-end operations system 114 may be combined into a single component or embodied in several components, either in proximity or remote from each other, without departing from the invention. For instance, the functions of the matching engine 118 may be performed by a processing unit.

Additionally, a position determination device 122 (e.g., global positioning satellites, land-based positioning cells, etc.) may provide the location of wireless terminals directly to the wireless terminals 102, 104, 106, and 108, to the base stations 110 and 112, and/or to the back-end operations system 114. Position determination device 122 (e.g., GPS satellite) may serve to provide either the exact or approximate location of each wireless terminal. Wireless terminal positions or locations may also be determined by "locating" a wireless terminal based on the base stations 110 and 112 with which it communicates or based on triangulation with two or more base stations.

The wireless terminals 102, 104, 106, and 108 may be wireless devices (e.g., mobile phones, pagers, wireless modems, personal digital assistants, personal information managers (PIMs), palmtop computers, laptop computers, and/or other mobile communication/computing devices) capable of running a resource-based and/or location-based service (LBS) application. For the purpose of this document, LBS applications include any program, applet, routine, or other such machine or processor-implemented algorithm that uses the location of either the wireless terminal in which the application is running or the location of another wireless terminal to provide information or service to a user. Examples of such LBS applications include programs that can: 1) identify the location of a wireless terminal being operated by another person to allow the LBS client (i.e., the person requesting the LBS service) to locate another person using a properly equipped wireless terminal; 2) locate a nearby product or service outlet and provide the user with directions to the outlet, such as an automatic teller machine or restaurant; 3) track a properly equipped wireless terminal, etc.

Wireless terminals 102, 104, 106, and 108 can communicate over wired and/or wireless links with a network of base stations 110 and 112. Base stations 110 and 112 are capable of receiving information from, and transmitting information to, wireless terminal 102, 104, 106, and 108 over wired and/or wireless links. Base stations 110 and 112 may include various other components (not shown) such as base stations controllers (BSCs), mobile switching centers (MSCs), etc.

The network of base stations 110 and 112 are coupled to the back-end operations system 114 by a communication medium, including, but not limited to cables, microwave links, satellite communication links, etc. The components in the back-end operations system 114 may be centrally located or distributed.

A novel infrastructure supports the LBS applications on wireless terminals 102, 104, 106, and 108. Two main groups of components are part of this infrastructure, the wireless terminal operating system and application components (e.g. match-enabled and/or location-based applications) and the back-end services (e.g., location-based matching services, targeted advertising, etc.) hosted by a service provider. These components may be developed based on standard operating systems, open protocols, and off-the shelf third party components to easily maintain and provide a friendly application development environment.

One or more of the components and functions illustrated in FIG. 1 may be combined into a single component or embodied in several components without departing from the invention.

Figure 2:
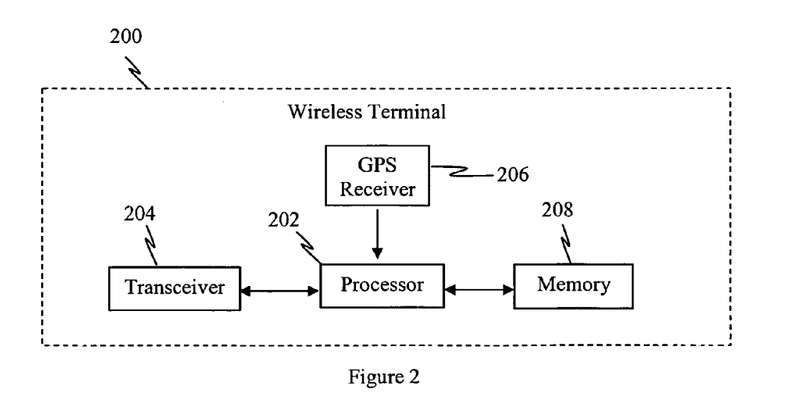
FIG. 2 is a block diagram of one implementation of a wireless terminal that may execute resource and/or location based matching services.

FIG. 2 is a block diagram of one implementation of a wireless terminal 200 that may execute resource and/or location based matching services. The wireless terminal 200 may include a processor 202, a transceiver 204, a global positioning system (GPS) receiver 206, and a memory device 208. Transceiver 204 transmits and receives wireless signals from base stations. GPS receiver 206 receives wireless signals, including location information, from satellites or other positioning devices. Processor 202 may be configured to provide several functions that operate in concert as a protocol stack. Location information is transmitted to other devices via transceiver 204. One or more resource-based and/or location-based, match-enabled applications may be executed on processor 202. In other implementations, one or more of the components and functions illustrated in FIG. 2 may be combined into a single component or embodied in several components without departing from the invention. Moreover, other wireless terminals having other components or without some of the components or functions illustrated in FIG. 2 fall within the scope of this invention.

Figure 3:
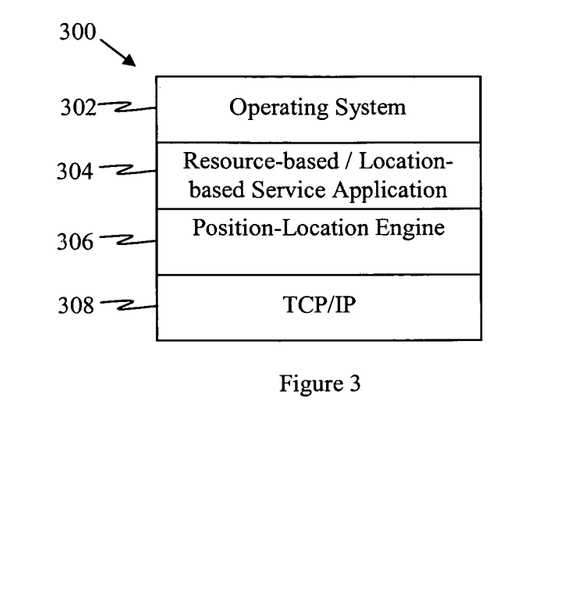
FIG. 3 is a diagram of an example of a protocol stack that may operate on a wireless terminal to execute resource and/or location based matching services.

FIG. 3 is a diagram of an example of a protocol stack 300 that may operate on a wireless terminal to execute resource and/or location based matching services. Protocol stack 300 may be any set of software routines or program instructions that may operate together, typically with one routine building on and using the functions of another lower level routine or program. A first function within the protocol stack 300 is the operating system 302. Operating system 302 is a foundational function upon which other functions may build. That is, operating system 302 includes functions that can be accessed and used by the other functions performed within the wireless terminal's processor. In one implementation, operating system 302 is a Binary Run-time Environment for Wireless (BREW) operating system. In other implementations, operating system 302 is a Wireless Application Protocol (WAP) system, a Short Message Service (SMS) operating system, a Java operating system, etc. ("Java" is a trademark of Sun Microsystems) or combination thereof. Those skilled in the art will appreciate that the particular operating system used is not directly relevant to the presently disclosed method and apparatus for performing location determination and providing location information via a location based services (LBS) architecture.

A resource-based service (RBS) and/or location-based services (LBS) application 304 may operate on top of the operating system 302. The RBS and/or LBS application 304 may access and utilize user interface functions to receive information from a wireless terminal user through a conventional data input device, such as a keyboard, touch screen, voice commands, etc. The RBS and/or LBS application 304 may also access and utilize the operating system functions to provide information to the wireless terminal user through an output device (e.g., liquid crystal diode (LCD) display screen, etc.).

RBS and/or LBS application 304 may also provide the wireless terminal user with the ability to find the location of wireless terminal, determine what points of interest and service outlets are in the vicinity of the wireless terminal (e.g., shops, automatic teller machines, restaurants, museums, etc.), and provide navigational directions and maps to the user based on a knowledge of the location of the wireless terminal and the location of particular service outlets and points of interest.

RBS and/or LBS application 304 may determine the resource(s) sought by a wireless terminal user. Resources may be matched by a user's preferences, specified needs, location and/or profile. Where location is a factor in the resource being matched, a position-location engine 306 may be used to determine the location of the wireless terminal. The position-location engine 306 may be any function capable of determining the location of the wireless terminal. For instance, position-location engine 306 may be a component of a global positioning satellite (GPS) system and may include a GPS receiver function that allows the wireless terminal to receive information from GPS satellites for the purpose of determining the location of the wireless terminal.

In one implementation, position-location engine 306 may request and receive aiding information from the PDD 122

(FIG. 1). For example, the wireless terminal may request information as to which satellites are "in view". If a satellite is in view, then the wireless terminal should be able to receive and demodulate information from that satellite.

In addition, a wireless terminal (e.g., 102 in FIG. 1) may request information regarding the locations of the in-view satellites, information about correction factors to be used when calculating the location of the wireless terminal using information received from the in-view satellites, information regarding the amount of Doppler shift that the wireless terminal may encounter when receiving signals from the in-view satellites, and other such useful information. This information enables the wireless terminal to more rapidly detect and "acquire" satellites. Acquisition of a satellite refers to the process by which the wireless terminal receives signals transmitted from the satellite and aligns the received information with local timing within the wireless terminal in preparation for the wireless terminal to interpret information modulated on the signals transmitted by the satellite.

FIG. 3 also shows a Transmission Control Protocol/Internet Protocol (TCP/IP) layer 308. TCP/IP layer 308 is a protocol layer that provides support for sending and receiving messages in accordance with the well-known TCP/IP communication protocol. Accordingly, information that is to be transmitted by the wireless terminal in accordance with the TCP/IP protocol is provided to TCP/IP layer 308. TCP/IP layer 308 then formats the information in accordance with the TCP/IP protocol specification so that other devices to which the information is to be transmitted can receive and interpret the information sent by the wireless terminal.

Once the TCP/IP layer 308 has formatted the information, the formatted information is transmitted in accordance with the TCP/IP protocol (i.e., the request/response ordering of the messages which constitute the handshake that takes place between a transmitting and receiving device).

Figure 4:
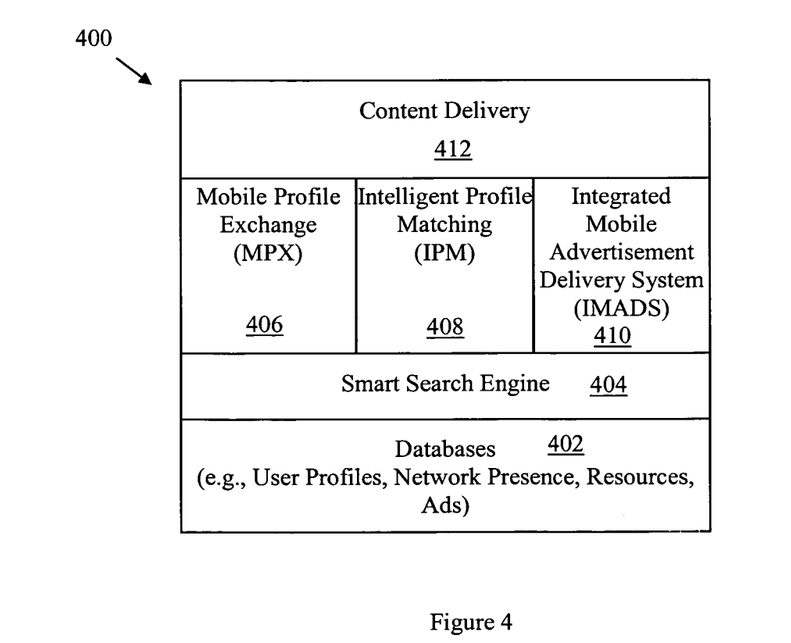
FIG. 4 illustrates novel back-end infrastructure components configured to provide resource and/or location matching applications and services according to one implementation.

A novel infrastructure supports location-based, match-enabled applications and communications with the wireless terminals. FIG. 4 illustrates novel back-end infrastructure components configured to provide resource and/or location based matching applications and services according to one implementation. One or more databases 402 serve to store information about registered wireless terminals, the user profiles, available networks, resources, and/or advertising. A smart search engine 404 parses through the databases 402 to extract the information therein. One or more applications may use the search engine to access and extract desired information. Such applications may include a Mobile Profile Exchange (MPX) 406 which facilitates exchange of profile information among users, Intelligent Profile Matching (IPM) 408 which matches users with one another, with interest groups, or with advertisers, and Integrated Mobile Advertisement Delivery System (IMADS) 410 which facilitates delivery of ads to targeted users. A content delivery application 412 distributes the application content to users' wireless terminals.

Figure 5:
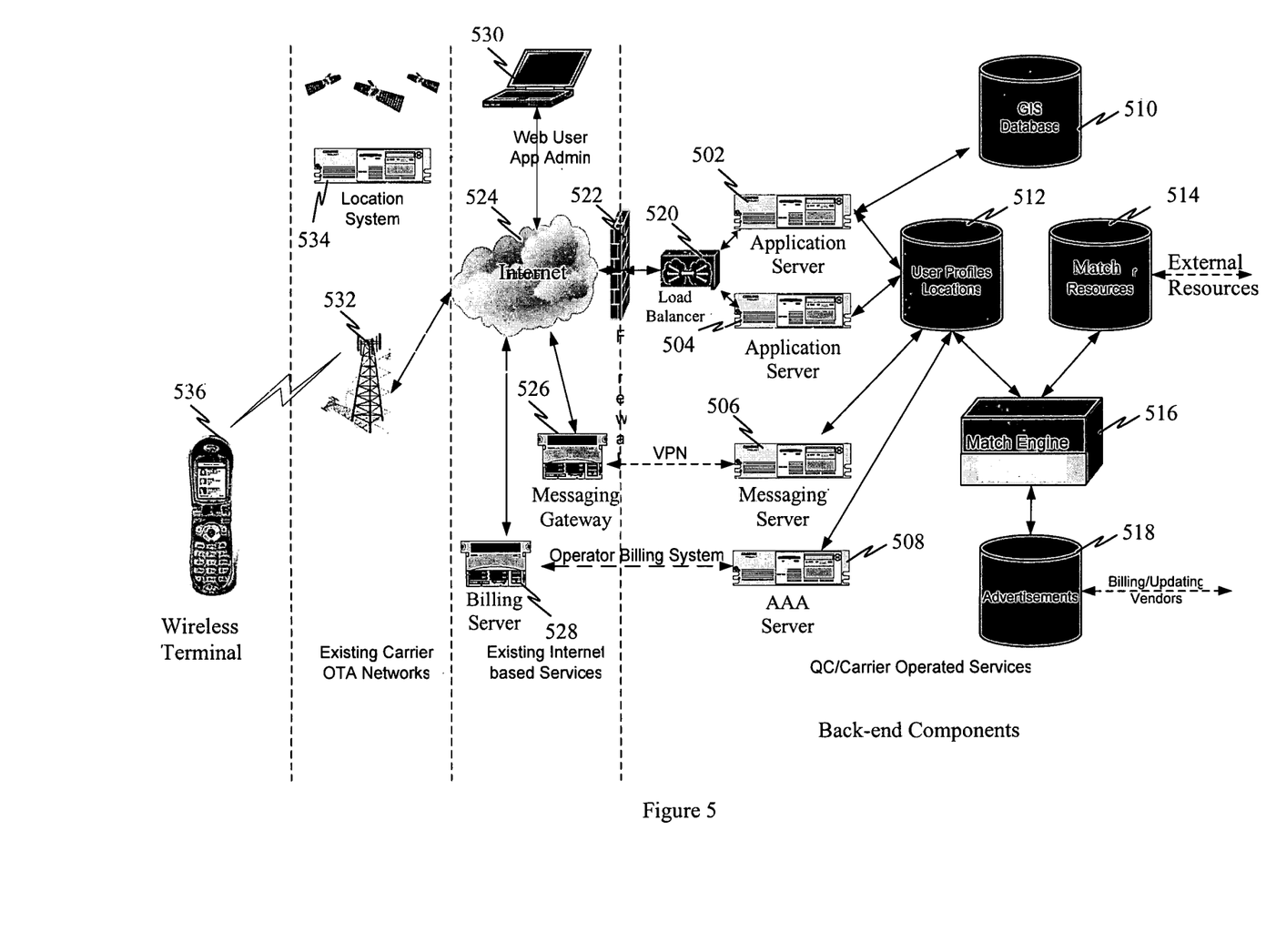
FIG. 5 is a block diagram illustrating one implementation of a resource-based service (RBS) and/or location-based matching service (LBS) system.

FIG. 5 is a block diagram illustrating one implementation of a resource-based service (RBS) and/or location-based matching service (LBS) system. At the back-end of the system, a plurality of application servers 502 and 504, messaging server 506, authentication, authorization and accounting (AAA) server 508, databases 510, 512, 514 stored in one or more storage devices, location-based matching engine 516, and advertisement database 518 are interconnected to transfer information there between. Application servers 502 and 504 run resource-based, location-based matching, advertising, and/or networking services that communicate over a network 524 with wireless terminals 536 and/or web clients. One or more of the components and functions illustrated in FIG. 5 may be combined into a single component (e.g. various servers or databases may be combined) or embodied in several components without departing from the invention.

Load-balancers 520 distribute the traffic between the network 524 and the application servers 502 and 504 and a firewall 522 protects the servers from unauthorized access. The load-balancers 520 may also perform automatic failovers in case of service failure on one of the servers 502 and 504.

The back-end system is communicatively coupled to one or more wireless terminals 536 via a network 524. In one implementation, the network 524 may be the Internet and include Internet-based billing support services 528 and management/administration applications 530.

The plurality of databases 510, 512, 514, and 518 and the match engine 516 serve as the backbone of the resource-based and/or location-based matching applications and services provided by the back-end system. As such, these databases may be highly-available, flexible, and deliver high-performance and scalability. Certain modules of the matching service, for example, application servers 502 and 504, messaging server 506, AAA server 508, databases 510, 512, 514, and 518, may support the Internet-based Simple Network Management Protocol (SNMPv2). Since SNMPv2 and SNMPv3 are widely supported by most network infrastructure manufacturers, a monitoring system may be implemented that monitors the status of the physical and application components of the back-end system.

There may be two categories of back-end databases, the core databases and the application extension databases. The core databases host the classes of objects that are common to all applications. In one implementation, individual applications may not be permitted to modify the schema of the core databases. The application extension databases are tailored to host application specific data. Application developers have control over the structure of their databases, using common data models. Application developers also dictate access control to their application extension databases and/or grant read/write access to one, many and/or all other applications. By separating the data into these two sets, flexibility is achieved while improving data integration and system efficiency. Some examples of information hosted by the core databases include essential user information (e.g., name, contact, billing, etc), location 512 and GIS databases 510, and advertisements 518. Application extension databases 514 may host information such as extended user profiles (e.g., hobby, eye-colors, etc.) and application-specific matching criteria, for example.

Access to the information in application extension databases is controlled using a built-in user/group access control. Each application may be mapped into an associated database. For each location-based match-enabled application, access control of the associated database may be achieved through the AAA server 508.

The match engine 516 may be a processor, circuit, server(s) and/or application(s) and database(s) configured to match a user with (1) other users, (2) targeted advertising, (3) businesses and/or (4) opportunities, etc. Depending on the application running on the wireless terminal 536 (e.g., cell phone, personal digital assistant, wireless communication device, etc.), the match engine 516 may match the user with other user based one or more criteria (e.g., relationships/dating, hobbies/sports, entertainment preferences, business networking opportunities, etc.). The match engine 516 contains a built-in matching algorithm that supports matching using resource-based and/or location-based data and provides matches for any user-defined "resource" to another "resource". These matching criteria may include user profile information or specific information provided to a particular match-enabled application. The match engine 516 may also take into consideration the permanent or current location and status (e.g., active versus not active) of all users in searching for matches. This way, a user is matched with other users that are in close geographical proximity. The matches found by the matching server are sent to the user's wireless terminal. In general, the location-based matching engine 516 may be tailored or modified to match a person to one or more resources (e.g., other people, restaurants, events, etc.) for any purpose. Examples of matching applications include, a restaurant finder that provides a user with information about restaurants in the vicinity of the user and meeting the user's preference, a theater locator to find a theater in the vicinity of the user that is showing a particular movie, and a person locator that matches the user's relationship, business, networking, or hobby interests.

One feature enables an administrator to configure how the matching is performed. In this manner, the matching engine and/or its algorithm may be configured, adjusted, or modified.

Another feature enables a user to specify matching criteria during run-time. For example, a user wishing to find the nearest vegetarian restaurant may enter such information in the appropriate application to receive the best restaurant results from the matching engine.

Different types of applications may be developed using this infrastructure. For example, one implementation may provide dating/relationship matching services between users within a given distance from each other. Another application may provide business/networking opportunities among users based on the user profiles and other specified criteria. For instance, a user may request matches for the nearest dentist, attorney or doctor in a given geographical region and with a given specialty. A similar application may enable users find the restaurants or automated teller machines (ATM) nearest their current location. Yet other applications may match users based on activities or hobbies. For example, a user may seek other users to play tennis or basketball within a given geographical region, and/or at particular day or time. Yet another application may enable users to monitor the location of other users. For instance, an application operating on may enable a parent to motor the location of their child.

One feature of the matching engine 516 is to allow the application developers to specify the characteristics of their objects (e.g., users or resources), specify the data type and values, define the object fields used to generate matches and allow the weights of the fields to be adjusted dynamically during run times. In this manner, the match engine 516 may be support a plurality of different resource/location matching applications for wireless terminals 536 and enables application developers to share the matching engine 516, its databases, servers, and distribution and/or communication systems. For instance, application developers may provide their own match-enabled applications for wireless terminals 536. They may employ the established communication network and servers to communicate with the matching engine. At the matching engine 516, application developers may define their own matching algorithm. This may be done by configuring the matching engine 516 to match users and/or resources according to a set of defined application-specific rules or criteria. In one implementation, a flexible architecture is provided that enables each application developer to store resource data in the match resources database 514 and/or advertisements database 518.

One feature of the location-based matching system enables application developers to define their own data fields, structure and relationships for a particular application. Some search objects, e.g., user profiles, may be common across all location-based matching applications. However, application-specific objects can be defined, for example, by the following tuples:

M_Class=<M_OID, Name, Size, Value, Constrains>,
where M_OID is a globally unique identifier of a particular M_Class, Name is the name of the class, Size is the size of the class, Value is the class value of the particular object, and Constraints specifies any particular conditions for the class.

A match object is an extension of M_Class, with one or multiple attributes. For example, a match attribute may be defined as:

M_Attribute=<M_Class_ID, M_Attibute_ID, Type, Size, Constrains>
M_Value=<MA_ID, Value>,
where M_Class_ID specifies the class identifier for the attribute, M_Attribute_ID specifies the attribute identifier, Type specifies the attribute type, Size specifies the size of the class, and Constraints specifies any particular conditions/limitations associated with the attribute. M_Value serves to specify the attribute value of a particular object.

Application-specific relationships for matching criteria may be defined by:

M_Relationship=<MR_ID, Application_ID, FromMA_ID, ToMA_ID, Type, Value, Weight, Constrains>,
where MR_ID is a relationship identifier, Application_ID is the application identifier for the application associated with relationship being defined, FromMA_ID specifies the match criteria of a first user or resource, ToMA_ID specifies the match criteria of a second user or resource, Type and Value define the type and value of the criteria (if any), Weight defines the relative importance of such criteria, and Constraint specifies any conditions for the particular match.

By defining such flexible class structure, application developers can define various objects (e.g., resources) for matching. In one implementation, the objects M_Class and M_Attribute may be pre-defined by the application developer. M_Relationship may be defined by different applications. These objects and data may be stored in one or more databases at the back-end of the matching system.

The match engine may use a ranking system that uses the resource and relationship profiles associated with a particular application. As noted above, relationship objects defines the relationships among resource attributes and how important they are compared to other relationships. Weight factors may be employed to rank the relative importance of the relationships.

Figure 6:
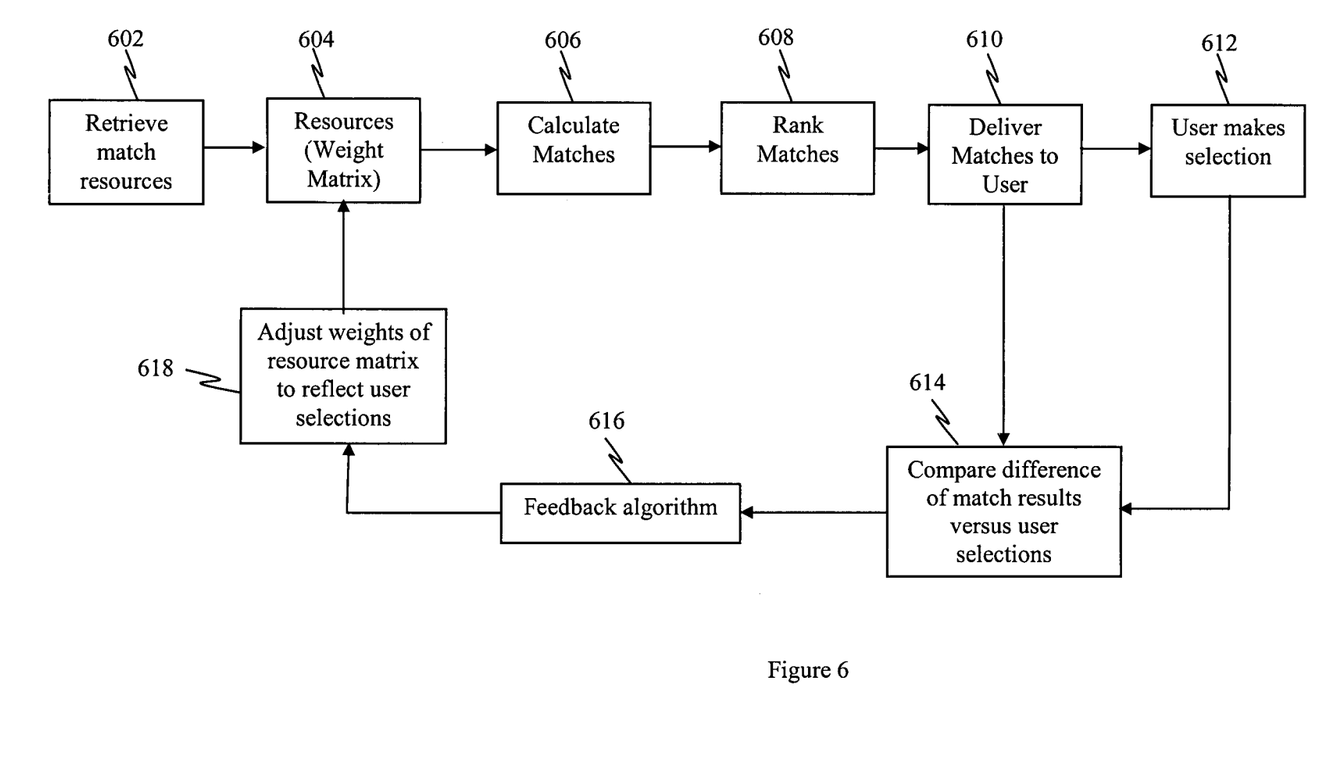
FIG. 6 is a flow diagram illustrating one implementation of how the match engine may operate to determine resource matches.

FIG. 6 is a flow diagram illustrating one implementation of how the match engine may operate to determine resource matches. The defined resources (match objects) for a location-based matching service are retrieved 602. For example, if a user is seeking local restaurants, the resources may include the restaurants nearest the user's location, the user's defined food preferences, the price range of the restaurants, etc. A weight matrix 604 is constructed that allocates a rank of importance to each resource (e.g., match condition). This may be based on the defined weight for each resource. Based on user preferences or requests, matches are then calculated 606 and ranked 608 for delivery to the user 610. The user may then make a selection 612 of a desired match to obtain further information about the match.

In one implementation, a learning mechanism is provided for the matching system. The delivered results and the user's selection are compared to determine the differences 614. A feedback algorithm 616 may be employed to adjust the weights of the resource matrix based on the user's selections 618. In this manner, the matching system is able to learn and refine its matching based on the user's preferences.

There are at least three ways to construct, update and remove resource relationships. First, a resource relationship may be initialized by an application developer who defines the matching criteria in addition defining user profiles. Secondly, relationships may be manually entered and/or updated by end-users, through match-enabled applications or other tools. For example, in a dating application, a user can decide hair-color is more important than height and adjust the resource weight field accordingly when performing a match search. Thirdly, relationships may be automatically updated by match engine using information learned by monitoring the user transactions and feedbacks from the application.

Security is an important feature of the matching service. Sensitive information, including users contacts and billing information, location information, usage patterns, user profiles and matching results, many be transmitted as part of the matching service and related applications. Thus, the system implements mechanisms to ensure the secure delivery of information from end-to-end and to prevent unauthorized usage of the applications and/or database contents. Referring again to FIG. 5, standard based encryption is provided at the application level, between applications on the wireless terminals 536 and application servers 502 and 504. Communications over terrestrial IP-based networks are protected via VPN or secure tunneling protocols. Application servers 502 and 504 also have the means of ensuring and verifying the authenticity of the querying application and subscriber.

In one implementation, application servers 502 and 504 have a standard-based remote authentication dial-in user service to enforce user authentication, authorization and accounting (AAA) policies. The AAA server 508 integrates with built-in authentication methods within the back-end databases to further enforce data access at the level of each application, and to streamline user credential management.

Based on the accounting information, periodic (e.g., monthly) billing information may be generated as defined by the application developers. In one implementation, a billing support server 528 may be coupled to the network 524 to provide billing information to the AAA server 508.

One or more base stations 532 may be communicatively coupled to the network 524 to enable communications with wireless terminals. One function of the application server 502 or 504 is to provide a scalable interface between wireless terminals 536 and back-end services. It provides protocol translation, updating users' location based on live feedbacks from the wireless terminal 536, and generates individualized usage maps based on user profiles 512 and geographic information system (GIS) database 510. The GIS database 510 may include information business, sites, maps, directions, etc., that can be sent to a user when requested.

A location-determination system 534 assists the wireless terminals in determining their position. Location-determination system 534 may include a position determination device, such as global positioning satellites, land-based positioning cells, etc., that assist wireless terminals in determining their location. Alternatively, wireless terminal positions may be determined by "locating" a wireless terminal based on the base station 532 through with it communicates or in the vicinity of the wireless terminal. Additionally, in FIG. 1 for example, a position determination device 122 (e.g., global positioning satellites, land-based positioning cells, etc.) may provide the location of wireless terminals directly to the wireless terminals 102, 104, 106, and 108, to the base stations 110 and 112, and/or to the back-end operations system 114. The position determination device (e.g., GPS satellite) may serve to provide either the exact or approximate location of each wireless terminal. Wireless terminal positions may also be determined by "locating" a wireless terminal based on the base station with which it communicates or based on triangulation with two or more base stations.

One feature of the hosting infrastructure for the matching service provides built-in redundancy at all networking, system, application, and database levels. Data may be backed up regularly at file system and database levels and a fail-over site may provide a complete copy of the hosting infrastructure.

In FIG. 5, another function of application servers 502 and 504 is to deliver content (e.g., advertisements) to the wireless terminals 536 based on the matching results of user profiles, location, application context, network presence and results from the matching engine. For example, the application servers 502 and 504 may send the location of a restaurant near a user, either as an advertisement or upon request, based on a match of user food preferences and eating habits that may be available in the user's profile.

A content delivery module operating on application servers 502 and 504 manages communications between the application servers 502 and 504 and wireless terminals 536. The content delivery module may 1) initiate TCP connections between wireless terminals 536 and application server 502 and 504, 2) manage the interface to the back-end databases 510, 512, 514, and 518 and match engine 516, 3) provide compression and encryption support, and/or 4) provide built-in timeout/retries to handle data errors and packet losses.

The messaging server 506 functions to provide communication support between the databases and the wireless terminals. This may include setting up one-to-one and group calls between users (e.g., wireless terminals), "waking up" a wireless terminal application using SMS messaging, and leveraging existing wireless terminal features.

An interactive voice response (IVR) component provides support for voice call setup, voice mail, group call services to wireless terminal users. IVR may be based on a traditional IVR telecommunication system. Integration using IVR would provide privacy, billing and other customer service functions to the system. To reduce the expenses and increase system reliability, multiple IVR systems may be deployed at various locations of concentrated users. This function can also be outsourced to outside call centers to provide operational efficiency.

Messaging Server 506 and Messaging gateway 526 operate transmit messages between the wireless terminals and back-end infrastructure components. The wireless terminal may include a messaging layer that monitors incoming Short Message Service (SMS) messages. These SMS messages are received by either match-enabled applications to which an SMS message has been directed or specific applications that have been registered to receive specific SMS messages based upon a unique ID of the message. A non-match-enabled SMS message is one that is not targeted for receipt by a match-enabled application. If a match-enabled application is running when a non-match-enabled SMS message is received by a mobile device, then the application is suspended/stopped and subsequently resumed/started after the SMS message is properly handled.

In one implementation, SMS services may be delivered by various email gateways from different carriers. An Email to SMS gateway is provided which supports multiple protocols to connect to various carrier's SMS gateways, provides a unified application interface regardless of the carrier and protocol, and leverage VPN to provide security protection. The gateway also provides format checking, filtering for attachments and signatures and throttling to prevent flooding the carriers network.

Delivery of matching result and advertisement to mobile devices varies greatly with respect to the resolution, memory, color support, BREW version/features and computational powers of the receiving mobile device. To achieve system operational efficiency and optimal user experience, it's important to tailor the content to fit the resolution, carrier service, and capability of each mobile device based preset device database.

As part of the content delivery component, the standard user profiles, application resources, match results and advertisement are converted into the format that best fits the end-user mobile device and service and hand-over the result to Content Delivery Module. Thus, the system includes features that transform text, static pictures, video, and audio.

A messaging protocol is defined for implementing location-based matching services between wireless terminals and a back-end server. Tables 1 and 2 illustrate a messaging protocol tailored for providing user-to-user profile matching and user-to-advertising matching. For instance, this messaging protocol may support services that match wireless terminal users based on their location, profile and/or defined matching criteria as well as provide focus advertising to users having certain characteristics (e.g., location, age, gender, interests, etc.). It should be clear that this protocol may be tailored to provide other types of resource-based and/or location-based matching services without departing from the invention.

TABLE 1

| Message ID | Command | Description |
|---|---|---|
| 0 | application <i> | Launched from a wireless terminal (e.g., mobile station) to notify that it is ready to use matching services (where 'i' is the application ID). |
| 1 | interest <j> | Send interest message to match user 'j'. |
| 2 | mutual <j> | Send mutual interest message to user 'j' in response to an interest message from user 'j'. |
| 3 | reject <j> | Reject match with user 'j'. |
| 4 | active <i> <lat/long> | Wireless terminal user 'i' is ready to receive matches and current location defined by latitude and longitude. |
| 5 | non-active <i> | User 'i' is no longer looking for matches. |
| 6 | get-msg <i> | Sign-up to back-end messaging system as user 'i' and get queued messages. |
| 7 | connect <j> | Indicate to back-end server interest in connecting with or calling user 'j'. |
| 8 | request <j> | Request profile information for user 'j'. |
| 11 | displayed <n><$a_1$> ... <$a_n$> | Index of n (unsigned 32 bits) advertisement(s) displayed to the user. |
| 12 | phone <p> | Associate this phone ID with the current user. |
| 13 | posreport <lat/long> | Report position latitude and longitude (unsigned 32 bits) to the back-end server, default is 0, 0. |
| 20 | application <i> | Match-enabled application 'i' is terminated on the wireless terminal; the matching service on the back-end servers can release the system resources. |
| 255 | reset <i> | Reset any state on this connection associated with user i. |

Table 1 illustrates a messaging protocol for match-enabled services or applications communicating from wireless terminals to a back-end server. A Message ID identifies the different types of Commands that can be sent from the match-enabled application running on a wireless terminal to the back-end servers. For example, command—application<i>—is sent by the match-enabled application when it is launched. This command or message notifies the back-end server that a match-enabled application 'i' has been launched on a particular wireless terminal. Command—interest <j>—allows a user to notify the back-end servers of its interest in learning more or contacting user 'j'. Command—mutual<j>—allows a user to reply to an 'interest' message from 'j' by acknowledging a mutual interest. Command—reject <j>—allows a user to notify the back-end servers of its lack of interest in user 'j'. Command—active <i><lat/long>—indicates that the wireless terminal user 'i' is ready to receive matches and its current location (latitude/longitude). Command—non-active <i>—allows wireless terminal user 'i' to inform the back-end servers that it is no longer looking for matches (e.g. user-to-user matches). Command—get-msg <i>—allows user 'i' to retrieve messages (e.g., text, voice, etc.) from a back-end messaging server. Command—connect <j>—indicate to back-end server interest in connecting with user 'j'. Command—request <j>—request profile information for user 'j'. Command—displayed <n><$a_1$> ... <$a_n$><j>—identifies the advertisement(s) that have already been displayed to the user of the wireless terminal (where 'n' is the number of advertisements and '$a_n$' are the advertisement IDs). Command—phone <p>—indicates that the phone ID should be associated with the current user of the wireless terminal. This allows the back-end servers to associate a particular user with the phone ID. Command—posreport <lat/long>—allows the wireless terminal to send its position (latitude and longitude) to the back-end server. This permits the matching service to match the user with the other users or opportunities (e.g., restaurants, theaters, gas stations, etc.) in the vicinity. Command—application <i>—indicates to the back-end server that match-enabled application 'i' is terminated on the wireless terminal. This allows the matching service on the back-end servers to release the system resources for this wireless terminal. Command—reset <i>—is used to reset any state on the connection with the associated user i.

TABLE 2

| Message ID | Command | Description |
|---|---|---|
| 0 | active-users <n users dating> <u-1 id> <u-1 lat/long> ... <u-n id><u-n lat/long> | Identifies the number of users n active on the system, followed by the user's IDs and a Latitude/Longitude position for each one. |
| 1 | interest <j> | Indicates a match interest from user j. |
| 2 | mutual <j> | Indicates a mutual interest with user j. |
| 3 | reject <j> | Rejection message from user j in response to an interest message. |
| 4 | non-active <i> | User j no longer looking for a match (remove from location map and match list). |
| 5 | match <n><user 1 id> ... <user n id> | Message indicating n users that match the user profile, followed by their user Ids. |
| 9 | profile <len> <user i profile data> | Sends the profile information of user i, total profile length 'len' and user i profile data. |
| 10 | ads-selection <n><$a_1$> ... <$a_j$> | The advertisements selected for this particular user, identified by number ads 'n' and ad index 'a'. |
| 14 | posrequest <n> | Request position update at interval n minutes. n = 0 means a one-time update only. |
| 20 | ads-content <n> <a1-id> <a1-length>< a1-data> ... <an-id> <an-length>< an-data> ... | n advertisement contents for user i. Each ad contains the ad-ID, the length of the content, and the ads themselves. |
| 254 | nack <j> | Negative acknowledgement of a last action request (e.g., interest, reject, etc.) intended for user j by this user; sent when user j has blocked messages from this user. |

TABLE 2-continued

| Message ID | Command | Description |
|---|---|---|
| 255 | reset <i> | Reset any state on the connection associated with user i. |

Similarly, Table 2 illustrates a messaging protocol for match-enabled services or applications communicating from a back-end server to wireless terminals. A Message ID identifies the different types of Commands that can be sent from the matching services on the back-end servers to the match-enabled applications on wireless terminals. For example, command—active-users <n users dating><user-1 id><user-1 lat/long> . . . <user-n id><user-n lat/long>—identifies the number of users n active on the matching system, followed by the user IDs and a Latitude/Longitude position for each user. Command—interest <j>—indicates a match interest from user 'j'. Command—mutual<j>—is a reply to a previous 'interest' message from 'j'. When received by the matching by acknowledging a mutual interest. Command—reject <j>—indicates a rejection from user 'j' in response to an interest message. Command—non-active <i>—indicates user 'j' is no longer looking for a match. Command—match <n><user 1 id> . . . <user n id>—indicates the n users that match a user's profile. Command—profile <len><user i profile data>—sends the profile information of user 'i' to a wireless terminal. Command—ads-selection <n><$a_1$> . . . <$a_j$>—indicates the advertisements selected for this particular user. Command—posreport <n>—is used by the back-end server to request a position update every n minutes from users. Command—ads-content <n><a1-id><a1-length><a1-data> . . . <an-id><an-length><an-data> . . . —indicates the content of the advertisements selected for user 'i'. Command—nack <j>—is a negative acknowledgement of a previous action; it is used to indicate that the intended user 'j' has blocked the messages from the user. Command—reset <i>— is used to reset any state on the connection with the associated user i.

Figure 7:
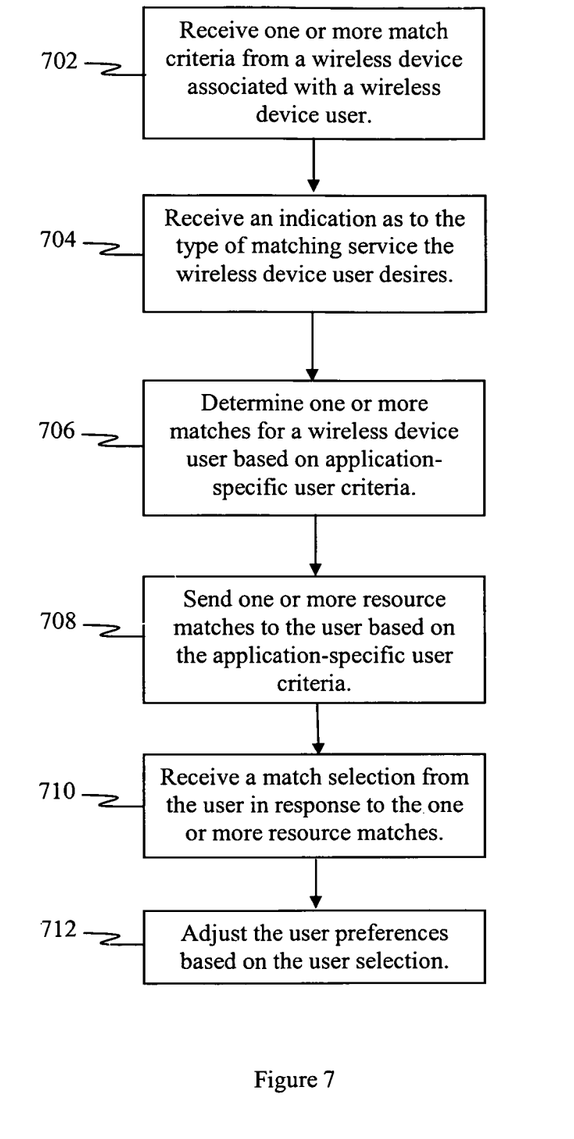
FIG. 7 is a diagram illustrating a method operational on a server for resource matching.

FIG. 7 is a diagram illustrating a method operational on a server for resource matching. The server receives one or more match criteria from a wireless device associated with a wireless device user 702 and an indication as to the type of matching service the wireless device user desires 704. The server then determines one or more matches for a wireless device user based on application-specific user criteria 706 and sends one or more resource matches to the user based on the application-specific user criteria 708. A wireless device user may then select a match and informs the server of its selection. The server receives the match selection from the user in response to the one or more resource matches 710. To better gauge future matches for a user, the server may adjust the user preferences based on the user selection 712.

Figure 8:
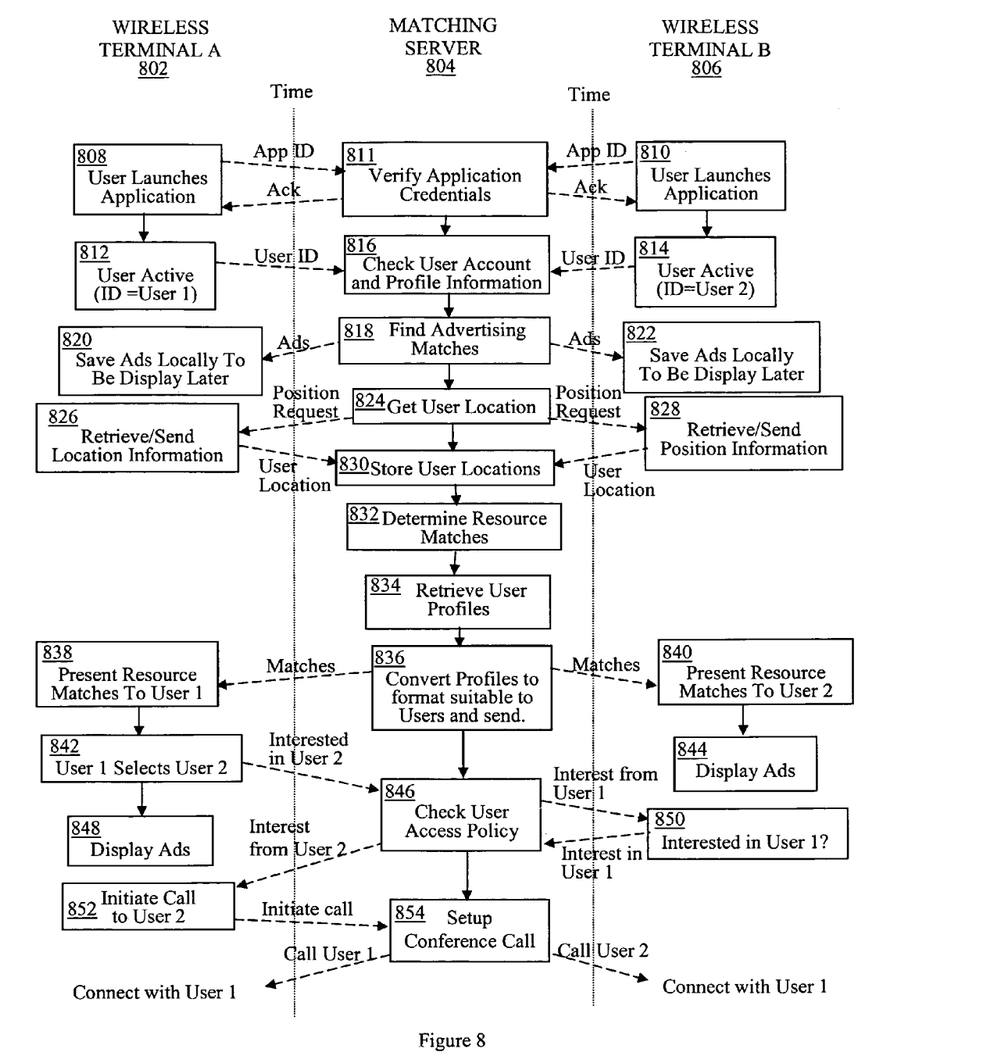
FIG. 8 is a diagram illustrating how user-to-user matching services and advertisement delivery may be implemented according to one example.

FIG. 8 is a diagram illustrating how user-to-user matching services and advertisement delivery may be implemented according to one example. When a match-enabled application is launched on wireless terminals 802 and 806, terminal users launch match-enabled applications 808 and 810 that send an application message with an Application ID to the matching server 804 (e.g., back-end servers and applications running the matching engine). Any messages received before the "application" message on a TCP connection are silently ignored. After the application message is received, all subsequent messages are processed in the context of that application. The matching server 804 may verify 811 and acknowledge this application message from wireless terminals 802 and 806.

In one implementation, wireless terminal 802 or 806 identifies the user to the matching server 804 via the "user active" message 812 and 814, with a User ID, after the "application" message is sent and before any other message is processed. This "user active" message sent from the wireless terminal 802 and 806 indicates that the associated user is now ready to find a match. Optionally, the "user active" message may also send the location (e.g., latitude and longitude) of the wireless terminal 802 and 806 to the matching server 804. After the "user active" message is received by the matching server 804, all subsequent messages are processed in the context of the identified user. The matching server 804 may then check the user account 816 and send all messages that may be queued for this user. In an optional implementation, the wireless terminal 802 and 806 (e.g., wireless phone) may also send a "phone" message to register a Phone ID associated with the user currently using the wireless terminal. If no "phone" message is received, the Phone ID or number previously associated with this user on the matching server 804 is used for any attempts to contact this user.

The matching server 804 checks the user account and profile information 816 to find advertising matches for this user 818. Such advertising matches 818 may include businesses, events, or other resources in the vicinity of the user or matching the user's interests or profile.

Depending on the application, the matching server 804 may match the user with other users based on one or more criteria (e.g., location, relationships/dating, hobbies/sports, business networking, etc.). In some embodiments, the matching server 804 may also take into consideration the permanent or current location and/or status (e.g., active versus not active) of all users in searching for matches. For this purpose, the matching server 804 may send a position request message 824 to users 802 and 806, either periodically or as needed, or command the user's wireless terminal 802 and 806 to retrieve and send 826 and 828 its position/location every n minutes. The terminal positions/locations are received and stored 830 by the server 804.

In one implementation, a user's position and/or other resources or criteria are used to determine a resource match. For example, a user may be matched with other users that are in close geographical proximity. User resource matches 832 are determined by the matching server 804, the matching profiles are retrieved 834, converted and sent 836 to the user's wireless terminal 802 and 806.

Upon receiving the matches, wireless terminals 802 and 806 present the resource matches to the users 838 and 840. A user can reply by sending an "interest" or "reject" message as desired. That is, upon receiving a match, a user can elect to either reject the resource match (a "reject" message is sent) or accept the resource match (an "interest" message is sent). If a user sends a "reject" message for an undesirable resource match, the rejected party is blocked from sending any messages to that user and is not included in any future match lists for that user.

If a first user (e.g., User 1 on terminal 802) sends an "interest" message to a selected second user 842 (e.g., User 2), the matching server 804 checks for the selected user's access policy 846 before forwarding the "interest" message to the selected user (e.g., User 2). The selected user (e.g., User 2) can then decide whether to reject or accept the interest message from the interested user (e.g., User 1) 850. If interested, the selected user sends an "interest" message (through 846), the message is forward to the first user (e.g., User 1) where the first user can decide whether to initiate a communication/call with the second user (e.g., User 2) 852. If a communication/call is initiated, the server 804 sets-up a call 854 between terminals 802 and 806.

When the matching server 804 sends a message to a user, if the target user is not connected to the server at that time, a message (e.g., SMS) is sent to the user notifying them they have new messages. In one implementation, one message is sent to notify a user that a new message has been received. Subsequent new messages do not trigger new notifications. A wireless terminal is expected to check-in with the messaging server within a preset time (e.g., 5 minutes). The notification may be resent one or more times if the wireless terminal does not connect to download its messages before the timer expires. Once a user checks its messages, then the message notification state and the timer are cleared and the first new message will again trigger a message notification. When a user transitions from the "active" to "non-active" state, the back-end servers clears all state information associated with its session.

If a wireless terminal 802 and 806 does not have a match profile cached, the wireless terminal sends a "request" message for that user profile, and the server 804 replies with a user "profile" message containing that match information.

Another feature provides for advertisement to be downloaded and stored on the phone during "off-peak" hours and selected by an index number by the "ads" message from the server during application run-time. For example, during low traffic periods the back-end server 804 finds matching ads 818 and transmits a plurality of ads to a wireless terminal where they are saved to be displayed later 820 and 822. The ads may be identified by indexes that an application can use to display an ad to the user. A "displayed" message allows the wireless terminal 802 and 806 to notify the back-end server 804 of the ads actually displayed to the user. The ads are later displayed 848 and 844 by the wireless terminals 802 and 806.

Upon terminating a match-enable application on a wireless terminal, an "application-exit" message is sent to the server, the server clears all state information associated with this user and application.

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A resource matching apparatus comprising:
a communication interface to communicate with one or more wireless devices;
a storage device configured to store wireless device user preferences and a plurality of application-specific matching algorithms, wherein each of a plurality of applications is associated with one of the plurality of application-specific matching algorithms for a particular user, wherein each of the plurality of application-specific matching algorithms is associated with a weight for one or more of the user preferences, wherein the weight indicates a level of importance of the one or more user preferences in matching in accordance with the associated application-specific matching algorithm; and
a processing unit coupled to an input interface and the storage device, the processing unit to implement a matching engine configured to:
obtain user preferences and an application-specific matching algorithm for a wireless device user from the storage device,
weight the obtained user preferences based on the obtained application-specific matching algorithm,
match the wireless device user with one or more resources based on the weighted user preferences to obtain one or more matches,
send the one or more matches to the wireless device user via the communication interface,
receive a match selection from the wireless device user in response to the one or more matches,
compare the match selection to the one or more matches sent to the wireless device user, and
adjust weights of the obtained user preferences in the matching engine based on the wireless device user selection.

2. The apparatus of claim 1 wherein the processing unit is further configured to:
obtain current location information for the one or more wireless device users; and
match the one or more resources to the wireless device user based on the current location of the wireless device user.

3. The apparatus of claim 2 wherein the one or more resource matches are related to businesses in a vicinity of the wireless device user's current location.

4. The apparatus of claim 1 wherein the processing unit is further configured to provide the wireless device user with a map or directions to the one or more resource matches.

5. The apparatus of claim 1 wherein the processing unit is further configured to:
provide the wireless device user with current location information of a second wireless device user.

6. The apparatus of claim 1 wherein the storage device is configurable to store a plurality of databases to support one or more match-enabled applications.

7. The apparatus of claim 1 wherein the storage device is configured to implement one or more databases for storing advertisements.

8. A resource matching apparatus comprising:
a communication interface to communicate with one or more wireless devices;
a storage device configured to store wireless device user preferences and a plurality of application-specific matching algorithms, wherein each of a plurality of applications is associated with one of the plurality of application-specific matching algorithms for a particular user, wherein each of the plurality of application-specific matching algorithms is associated with a weight for one or more of the user preferences, wherein the weight indicates a level of importance of the one or more user preferences in matching in accordance with the associated application-specific matching algorithm; and
a processing unit coupled to an input interface and the storage device, the processing unit configured to:
receive an indication that a wireless device user is ready to receive a match;
receive an indication of a type of matching service the wireless device user desires;
receive one or more match criteria from the wireless device user;
notify a match engine of the one or more match criteria,
the processing unit further configured to implement a matching engine configured to:
obtain user preferences and an application-specific matching algorithm for the wireless device user from the storage device,
weight the obtained user preferences based on the obtained application-specific matching algorithm, match the wireless device user with one or more resources based on the weighted user preferences to obtain one or more matches, and send the one or more matches to the wireless device user via the communication interface.

9. A resource matching device comprising:

means for communicating with one or more wireless devices employed by one or more users;

means for storing wireless device user preferences and a plurality of application-specific matching algorithms, wherein each of a plurality of applications is associated with one of the plurality of application-specific matching algorithms for a particular user, wherein each of the plurality of application-specific matching algorithms is associated with a weight for one or more of the user preferences, wherein the weight indicates a level of importance of the one or more user preferences in matching in accordance with the associated application-specific matching algorithm; and means for processing resource-based matches configured to:

obtain user preferences and an application-specific matching algorithm for a wireless device user from the means for storing, weight the obtained user preferences based on the obtained application-specific matching algorithm, match the wireless device user with one or more advertisements based on the user preferences; and send the matched one or more advertisements to the wireless device user via the communication interface;

receive a match selection from the wireless device user in response to the one or more matched advertisements;

compare the match selection to the one or more matched advertisements sent to the wireless device user; and adjust weights of the obtained user preferences in the obtained application-specific matching algorithm based on the wireless device user selection.

10. A resource matching method comprising:

determining one or more resource matches for a wireless device user based on user preferences and one of a plurality of application-specific matching algorithms, wherein each of a plurality of applications is associated with one of the plurality of application-specific matching algorithms for a particular user, wherein each of the plurality of application-specific matching algorithms is associated with a weight for one or more of the user preferences, wherein the weight indicates a level of importance of the one or more user preferences in matching in accordance with the associated application-specific matching algorithm;

receiving one or more match criteria from a wireless device associated with the wireless device user;

receiving an indication as to a type of matching service the wireless device user desires;

sending the one or more resource matches to the wireless device user;

receiving a match selection from the user in response to the one or more resource matches;

comparing the match selection to the one or more resource matches sent to the user; and automatically adjusting weights of at least one user preference in the application-specific matching algorithm used by the determining step based on the user selection.

11. The resource matching method of claim 10 further comprising assigning a given weight to each user preference, wherein each assigned weight indicates a given level of importance of the associated user preference in matching.

12. The resource matching method of claim 10 further comprising:

obtaining current location information for the wireless device user; and matching the one or more resources to the wireless device user based on the current location of the wireless device user.

13. The method of claim 10, wherein two or more of the plurality of applications are developed by different application developers, and the different application developers separately develop initial application-specific matching algorithms associated with their respective applications.

14. The method of claim 13, wherein the automatically adjusting step is performed on one of the initial application-specific matching algorithms.

15. A processing unit comprising:

an input interface to receive user preferences and current location information for a wireless device user;

a processing circuit communicatively coupled to the input interface and configured to determine one or more matches for the wireless device user based on the user preferences, current location, and one of a plurality of application-specific matching algorithms, wherein each of a plurality of applications is associated with one of the plurality of application-specific matching algorithms for a particular user, wherein each of the plurality of application-specific matching algorithms is associated with a weight for one or more of the user preferences, wherein the weight indicates a level of importance of the one or more user preferences in matching in accordance with the associated application-specific matching algorithm; and an output interface communicatively coupled to the processing circuit to transmit the one or more matches to the wireless device user, wherein the processing circuit is further configured to receive a match selection from the wireless device user in response to the one or more matches, to compare the match selection to the one or more matches sent to the wireless device user and to adjust weights of at least one user preference in the application-specific matching algorithm used to determine the one or more matches based on the received match selection, and wherein the processing circuit is further configured to receive information about a type of matching service the wireless device user desires, and receive one or more match criteria from the wireless device user.

16. The processing unit of claim 15 wherein the processing circuit is further configured to:

receive a match selection from the wireless device user in response to the one or more matches; and adjust the user preferences based on the user selection.

17. The processing unit of claim 15 wherein the processing circuit is further configured to:

match the wireless device user with one or more advertisements associated with at least one business within a specified geographical distance from a current location of the wireless device user.

18. A non-transitory computer readable storage medium encoded with one or more computer executable instructions for resource matching, which when executed by a processor cause the processor to:

obtain one or more resource matching criteria for a wireless communication device user, wherein the criteria includes user match preferences and a current location information of the wireless communication device user;

receive an indication that the wireless communication device user is ready to receive a match;

receive an indication as to a type of matching service the wireless communication device user desires;

receive one or more match criteria from the wireless communication device user;

notify a matching engine of the one or more match criteria;

match one or more resources to the wireless communication device user based on the user match preferences and the current location information, wherein a configurable matching engine is employed to perform the match, the configurable matching engine utilizes one or more configurable rules to perform the match, at least one of the one or more configurable rules specifying one of a plurality of matching algorithms to employ to perform the match, each of the plurality of matching algorithms associated with at least one of a plurality of applications and each of the plurality of matching algorithms indicating different sets of weights for the user match preferences that are used to determine matches for a particular application from the plurality of applications;

send the one or more resource matches to the wireless communication device user;

receive a match selection from the wireless communication device user in response to the one or more resource matches;

compare the match selection to the one or more resource matches sent to the wireless communication device user; and adjust weights for the user match preferences of the matching algorithm used to determine the one or more resource matches based on the wireless communication device user selection.

19. The non-transitory computer readable storage medium of claim 18, wherein each user match preferences is assigned a given weight, wherein each assigned weight indicates a given level of importance of the associated user match preference in matching.

20. The non-transitory computer readable storage medium of claim 18 wherein the one or more resource matches are one or more other registered users.

21. The non-transitory computer readable storage medium of claim 18 wherein the one or more resource matches are targeted advertising.

22. The non-transitory computer readable storage medium of claim 18 wherein the one or more resource matches are businesses in a vicinity of the wireless communication device user's current location.

23. The non-transitory computer readable storage medium of claim 18 further having one or more instructions which when executed by the processor cause the processor to:

provide the wireless communication device user with current location information of a second wireless communication device user.

24. The non-transitory computer readable storage medium of claim 18 further having one or more instructions which when executed by the processor cause the processor to:

provide the wireless communication device user with a map or directions to the one or more resource matches.

25. The non-transitory computer readable storage medium of claim 18 further having one or more instructions which when executed by the processor cause the processor to:

provide a configurable resource structure to support multiple types of resource matches.

* * * * *